Patented Dec. 5, 1933

1,938,178

UNITED STATES PATENT OFFICE 1,938,178

HYDROLYSIS OF ESTERS

William Engs and Richard Z. Moravec, Berkeley, Calif., assignors to Shell Development Company, San Francisco, Calif., a corporation of Delaware No Drawing. Application September 22, 1931
Serial No. 564,472

25 Claims. (Cl. 260—156)

This invention relates to a process for the manufacture of alcohols from the corresponding sulfuric esters or like esters obtained in the well known way by absorbing olefines in sulfuric acid or other suitable acids, such as phosphoric or sulfonic acids.

The process, according to the invention, is particularly advantageous in that it allows alcohols and a valuable product to be produced in an economical manner, as will be described hereinafter.

It is known that alcohols are formed by absorbing olefines in acid and hydrolyzing the acid reaction liquid by dilution with water, after which the alcohol is distilled off.

It has been observed that the tertiary alcohols in particular and also the secondary alcohols are in part destroyed by the action of the acid in the reaction liquid, even when the liquid is diluted to a high degree, so that on subjecting the diluted reaction liquid to distillation, the yield of alcohols is considerably decreased. In order to overcome this drawback it has already been proposed to neutralize the acid reaction liquid before distilling, for instance, with lime. Lime, however, has the drawback that with the acids, it yields calcium salts, which are insoluble, and therefore hinders the proper distillation of the alcohols.

According to the present process, the above-mentioned disadvantage is overcome and further advantages are obtained, which will be illustrated hereinafter.

According to the invention, the process for the hydrolysis of esters consists in diluting the strongly acid solution of ester as obtained with water, NH$_3$, or the like whereby the free acid content is reduced to a point most favorable for hydrolysis—between about 30 to 40% (calculated as total titratable hydrogen expressed in terms of H$_2$SO$_4$). The dilute acid liquor is heated to and maintained at a temperature whereat the ester is not decomposed to the original olefine or polymer. The maximum temperature is employed in order to effect hydrolysis in the shortest time interval without distillation of the alcohol. Thus, hydrolyzation of the ester is effected at a much high acidity and lower temperature than formerly. After a time, equilibrium would be attained in the system comprising ester, water, acid and alcohol. The tendency of continued operation would be the decomposition of the ester as the free acid content builds up in the system during hydrolysis according to the reaction:

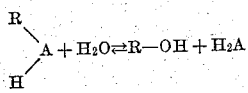

wherein R represents an organic residue and A an acidic residue of a divalent acid. Consequently, during the hydrolyzation stage, a basic material such as caustic, ammonia, in the gaseous, liquid, aqueous or anhydrous state, or solutions of basic salts of ammonia, as ammonium carbonate, ammonium carbamate, and the like is continuously or intermittently added to the dilute acid liquor so as to maintain the predetermined acidity as described heretofore. The basic material added expedites the rate of hydrolysis at the existing conditions as well as prevents the decomposition of the ester. By unbalancing the reaction in the right hand direction, it thus prevents the establishment of equilibrium as well as the formation of acid beyond a predetermined concentration. A free acid content between 30 to 40% in ester solutions has been found most desirable for hydrolyzing conditions, although in certain instances the range may be extended in either direction. After hydrolysis is complete or substantially complete, the alcoholic liquor is treated with a basic material, which is substantially insoluble or difficultly insoluble in the alcohol as such or as a salt of the free acid, to substantially neutralize all of the free acid although in certain instances it may be desirable to avoid complete neutralization of the free acid. Ammonia in the gaseous, liquid, aqueous or anhydrous state may be employed as the basic material as may solutions of basic salts of ammonia, as ammonium carbonate, ammonium carbamate and the like, as well as caustic and other alkaline compounds.

The tremendous amount of heat energy evolved due to the heats of neutralization and dilution may be utilized to reflux the alcohol or to distill a portion of the same without the application of further heat or the heat may be dissipated in other ways as by appropriate cooling surfaces.

The material stratifies into two layers, an upper alcohol layer and a lower aqueous ammonium salt solution layer. Where solutions of ammonium salts have been utilized to neutralize the acid liquor, the lower layer will comprise a solution of a plurality of ammonium salts. Where other basic material is employed, it will be found in the lower layer in the form of a solution of its salt; the type of salt depending on the acidic character of the ester being hydrolyzed. If the two layers are separated before distilling off all the alcohol, the lower layer is quite clear and practically free from carbon compounds.

For purposes of illustration only, reference will be had to the hydrolysis of butyl hydrogen sulfate in acid solution which has been formed by absorbing the corresponding olefine in sulfuric acid although it is to be understood that the process is by no means restricted to the manufacture of particular alcohols as it is particularly advantageous for the production of tertiary and secondary alcohols which are apt to be destroyed when distilled in the presence of even dilute acid.

Butyl hydrogen sulfate liquor as customarily obtained by the absorption of the corresponding olefine in sulfuric acid is very strongly acid, running well above 40% acidity (total titratable hydrogen expressed in terms of $H_2SO_4$). The strong acid sulfate liquor is diluted to between 30 to 40% acidity, preferably about 35%, instead of 10 to 15% acidity which is the dilution necessary to prevent serious decomposition of the ester when hydrolysis is carried out by distilling the alcohol from acid solutions, thereby reducing the volume of dilution water from about 3 gallons/gallon butyl hydrogen sulfate to about 0.5 gallons/gallon butyl hydrogen sulfate. The diluted butyl hydrogen sulfate is run into a settling tank to skim off the dibutyl sulfate present which forms a layer or scum on the surface of the diluted acid liquor. The lower acid layer in the settling tank is pumped into a hydrolyzing tank, where it is heated for about 5 to 6 hours at about 50° C. with addition of ammonia to maintain the free acidity below the equilibrium point. At the given temperature and range of free acidity, conditions are most favorable for the substantially complete hydrolysis of the butyl hydrogen sulfate within the most satisfactory time interval without its decomposition to olefine or polymer. The temperature should not substantially exceed 50° C. under the above conditions.

After complete hydrolysis, the liquor is substantially neutralized with ammonia, the ammonium sulfate causing stratification of the material into an upper alcohol layer and a lower aqueous ammonium sulfate layer. The latter may or may not be substantially saturated with respect to the ammonium sulfate, depending on the conditions of operation. In the present instance, the latter is saturated with ammonium sulfate and contains 0.4% alcohol by weight or less than 1% of the total available alcohol. The lower layer, which on cooling deposits some solid ammonium sulfate, is worked up in the usual manner. The top layer, consisting of crude alcohol, is run into a storage tank, from which it is fed to a series of rectification columns for further purification and dehydration. It is to be remembered that when the ammonia is added in the second stage for substantially complete neutralization of the free acid, a large amount of heat of neutralization and dilution is available. It can be utilized to reflux the liquor, employing a condenser to remove the heat or a portion of the alcohol may be permitted to distill over to suitable apparatus for further treatment without the application of additional heat. The alcohol should not, however, be allowed to distill completely from the hydrolyzing tank, as this would result in the dissolved polymers and coloring agents, which it contains, being left behind in the ammonium sulfate liquor and lead eventually to a discolored ammonium sulfate. If the two layers are separated before distilling off all the alcohol, the lower layer is clear and practically free from carbon compounds. Cooling units may be employed in, on or auxiliary to the hydrolyzing tank to prevent the complete distillation of alcohol therefrom prior to the separation of the two layers. If desired, the pump employed to remove the ammonium sulfate solution may be utilized to circulate the material in the hydrolyzing tank. Agitation should be provided to ensure a uniform temperature during hydrolysis and proper mixing during neutralization. The temperature in the hydrolyzing tank will vary in temperature between 40° C. and 100° C. during the course of neutralization but the exact temperature is not of importance as long as the hereto-forementioned precautions are observed.

This method of operation offers the following advantages: An increase in alcohol yield of from 5 to 10% over the yield obtainable by hydrolyzing and distilling the alcohol acid solutions—by a reduction in the decomposition to butylene during hydrolysis; a 60% reduction in the volume of dilute butyl hydrogen sulfate; a large reduction in volume of material to be handled in converting the waste acid to ammonium sulfate; hydrolyzation of the butyl hydrogen sulfate at a much higher acidity and lower temperature than formerly; acid bottoms which contain clear ammonium sulfate as the impurities are in the alcohol layer and removed therefrom during rectification whereas the impurities experienced in the normal course of procedure with dilute $H_2SO_4$ are difficult to remove.

In this way, valuable by-products, for instance, ammonium sulfate or ammonium phosphate, which may serve as constituents of artificial manure, may be obtained according to the present process with hardly any additional cost.

The process can be carried out with any of the esters of the olefines capable of forming secondary or tertiary alcohols upon hydrolysis and is not dependent upon the particular number of carbon atoms contained in each olefinic molecule as it can be practiced with the esters of ethylene, propylene, butylene, amylene, hexylene and the like. If desired, the process can be executed with mixtures of the esters to form suitable mixtures of the corresponding alcohols.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for hydrolyzing acid esters prepared by absorbing olefines in a polybasic mineral acid, comprising: adjusting the free acid content of the ester solution so that substantially complete hydrolysis may be attained without substantial decomposition of the ester by the regulated addition of a diluent, substantially completely hydrolyzing the ester content at a temperature below that at which the alcohol formed distills off while neutralizing the generated acid, reducing the free acid content to a value substantially below that maintained during hydrolysis and recovering the alcohol formed.

2. A process for hydrolyzing acid esters prepared by absorbing olefines in a polybasic mineral acid, comprising: adjusting the free acid content of the ester solution so that substantially complete hydrolysis may be attained without substantial decomposition of the ester by the regulated addition of a diluent, substantially completely hydrolyzing the ester content at a temperature below that at which the alcohol formed distills off, while maintaining the predetermined free acid content by the addition of inorganic basic material during hydrolysis, reducing the free acid content to a value substantially below that maintained during hydrolysis and recovering the alcohol formed.

3. A process for hydrolyzing acid esters prepared by absorbing olefines in a polybasic mineral acid, comprising: Substantially completely hydrolyzing the ester in its solution of acid at a temperature and with such a free acid content that substantially no decomposition of the ester is effected by the addition of a regulated quantity of inorganic basic material during hydrolysis, reducing the free acid content to a value substantially below that maintained during hydrolysis and recovering the alcohol formed.

4. A process for hydrolyzing acid esters prepared by absorbing olefines in a polybasic mineral acid, comprising: substantially completely hydrolyzing the ester in its solution of acid at a temperature and with such a free acid content that substantially no decomposition of the ester is effected by neutralizing the acid generated during hydrolysis, reducing the free acid content to a value substantially below that maintained during hydrolysis by the addition of inorganic basic material and recovering the alcohol formed.

5. A process for hydrolyzing acid esters prepared by absorbing olefines in a polybasic mineral acid, comprising: substantially completely hydrolyzing the ester in its solution of acid by neutralizing the acid generated during hydrolysis without distilling off the alcohol, reducing the free acid content to a value substantially below that maintained during hydrolysis and recovering the alcohol formed.

6. A process for hydrolyzing acid esters prepared by absorbing olefines in a polybasic mineral acid, comprising: substantially completely hydrolyzing the ester in its solution of acid by neutralizing the acid generated during hydrolysis without distilling off the alcohol, neutralizing the free acid content and recovering the alcohol formed.

7. A process for hydrolyzing acid esters prepared by absorbing olefines in a polybasic mineral acid, comprising: substantially completely hydrolyzing the ester in its solution of acid by neutralizing the acid generated during hydrolysis without distilling off the alcohol, neutralizing the free acid content, separating the alcohol layer formed from the other layer and recovering valuable products from both.

8. A process for hydrolyzing acid esters prepared by absorbing olefines in a polybasic mineral acid, comprising: substantially completely hydrolyzing the ester in its solution of acid by neutralizing the acid generated during hydrolysis without distilling off the alcohol, neutralizing the free acid content and utilizing the heats of dilution and neutralization to distill off some of the alcohol, separating the remainder of the alcohol from the neutral product and rectifying the alcohol recovered.

9. A process for hydrolyzing acid esters prepared by absorbing olefines in a polybasic mineral acid, comprising: substantially completely hydrolyzing the ester in its solution of acid by neutralizing the acid generated during hydrolysis without distilling off the alcohol, neutralizing the free acid content and dissipating the heats of dilution and neutralization by refluxing the liquid mixture and recovering the alcohol.

10. A process for hydrolizing acid esters obtained by absorbing olefines in a polybasic mineral acid, comprising: substantially completely hydrolyzing the ester in its solution of acid by neutralizing the acid generated during hydrolysis without distilling off the alcohol, neutralizing the free acid content and dissipating the heats of dilution and neutralization by refluxing the liquid mixture, separating the alcohol layer formed from the other layer and recovering valuable products from both.

11. A process for hydrolyzing acid esters prepared by absorbing olefines in a polybasic mineral acid, comprising: adjusting the acidity of the ester solution to about 30 to 40%, calculated as total titratable hydrogen expressed in terms of $H_2SO_4$, substantially completely hydrolyzing the ester content of the solution at this acidity while avoiding substantial decomposition of the ester by neutralization of the acid generated during hydrolysis, reducing the free acid content to a value substantially below that maintained during hydrolysis and recovering the alcohol formed.

12. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, while avoiding substantial decomposition of the ester by neutralization of the acid generated during hydrolysis, reducing the free acid content to a value substantially below that maintained during hydrolysis and recovering the alcohol formed.

13. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, while avoiding substantial decomposition of the ester by neutralization of the acid generated during hydrolysis, reducing the free acid content to a value substantially below that maintained during hydrolysis by the addition of inorganic basic material and recovering the alcohol formed.

14. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, reducing the free acid content to a value substantially below that maintained during hydrolysis and recovering the alcohol formed.

15. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, neutralizing the free acid content and recovering the alcohol formed.

16. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, neutralizing the free acid content with an inorganic ammoniacal compound and recovering the alcohol formed.

17. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, neutralizing the free acid content with an inorganic ammoniacal compound, utilizing the heats of dilution and neutralization to distill off some of the alcohol, separating the remainder of the alcohol from the neutral product and rectifying the alcohol recovered.

18. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, neutralizing the free acid content with an inorganic ammoniacal compound, utilizing the heats of dilution and neutralization to reflux the liquid mixture and recovering the alcohol.

19. A process for hydrolyzing acid esters prepared by absorbing olefines in a polybasic mineral acid, comprising: substantially completely hydrolyzing the ester in its solution of acid at an acidity of about 30 to 40%, calculated as total titratable hydrogen expressed in terms of $H_2SO_4$, by neutralization of the acid generated during hydrolysis without distilling off the alcohol, neutralizing the free acid content with inorganic basic material which is substantially insoluble in the alcohol as such or as a salt, dissipating the heats of dilution and neutralization by refluxing the liquid mixture, separating the alcohol layer formed from the other layer and recovering valuable products from both.

20. A process for hydrolyzing acid esters prepared by absorbing olefines in a polybasic mineral acid, comprising: adjusting the acidity of the ester solution to about 30 to 40%, calculated as total titratable hydrogen expressed in terms of $H_2SO_4$, substantially completely hydrolyzing the ester content of the solution at this acidity while avoiding substantial decomposition of the ester by introducing into the solution regulated amounts of inorganic basic material, reducing the free acid content to a value substantially below that maintained during hydrolysis by addition to the alcohol liquor of inorganic basic material which is substantially insoluble in the alcohol as such or as a salt and recovering the alcohol formed.

21. In a process for hydrolyzing acid esters prepared by absorbing olefines in a polybasic mineral acid, the step of: substantially completely hydrolyzing said esters in a solution of acid at an acidity not greater than about 40%, calculated as total titratable hydrogen expressed in terms of $H_2SO_4$, by introducing into the solution regulated amounts of inorganic basic material during hydrolysis.

22. In a process for hydrolyzing acid esters prepared by absorbing olefines in a polybasic mineral acid, the step of: substantially completely hydrolyzing said esters in a solution of acid at an acidity not greater than about 40%, calculated as total titratable hydrogen expressed in terms of $H_2SO_4$, by introducing into the solution regulated amounts of ammonia during hydrolysis.

23. In a process for hydrolyzing secondary alkyl acid esters prepared by absorbing olefines in sulfuric acid, the step of: substantially completely hydrolyzing said secondary alkyl acid sulfates in a solution of sulfuric acid at an acidity not greater than about 40%, calculated as total titratable hydrogen expressed in terms of $H_2SO_4$, by introducing into the solution regulated amounts of basic material during hydrolysis.

24. In a process for hydrolyzing secondary butyl hydrogen sulfate, the step of: substantially completely hydrolyzing said secondary butyl hydrogen sulfate in a solution of sulfuric acid at an acidity not greater than about 40%, calculated as total titratable hydrogen expressed in terms of $H_2SO_4$, by introducing into the solution regulated amounts of ammonia during hydrolysis.

25. In a process for hydrolyzing secondary amyl hydrogen sulfate, the step of: substantially completely hydrolyzing said secondary amyl hydrogen sulfate in a solution of sulfuric acid at an acidity not greater than about 40%, calculated as total titratable hydrogen expressed in terms of $H_2SO_4$, by introducing into the solution regulated amounts of ammonia during hydrolysis.

WILLIAM ENGS.
RICHARD Z. MORAVEC.